United States Patent

Ramsay

[11] 4,008,061
[45] Feb. 15, 1977

[54] METHOD OF MAKING OPTICAL FIBER OPTICAL POWER DIVIDER

[75] Inventor: Melvin M. Ramsay, Harlow, England

[73] Assignee: International Standard Electric Corporation, New York, N.Y.

[22] Filed: Jan. 6, 1976

[21] Appl. No.: 646,818

[30] Foreign Application Priority Data

Jan. 23, 1975 United Kingdom ............... 3000/75

[52] U.S. Cl. .................................. 65/4 A; 65/4 B; 65/4 R; 65/36; 65/37; 350/96 C
[51] Int. Cl.² ..................... C03C 23/20; G02B 5/14
[58] Field of Search ................ 65/DIG. 7, 4 A, 4 R, 65/4 B, 36, 37, 38; 350/96 C

[56] References Cited

UNITED STATES PATENTS

| | | | |
|---|---|---|---|
| 3,455,667 | 7/1969 | Snitzer et al. ........................... | 65/38 |
| 3,455,668 | 7/1969 | Upton ..................... | 65/38 |
| 3,535,017 | 10/1970 | Miller ............... | 65/DIG. 7 |
| 3,579,316 | 5/1971 | Dyott et al. ........................... | 65/4 B |
| 3,615,312 | 10/1971 | Landry et al. .......................... | 65/37 |
| 3,810,802 | 5/1974 | Buhite et al. .................... | 65/DIG. 7 |
| 3,819,249 | 6/1974 | Borner et al. .................... | 65/DIG. 7 |
| 3,825,319 | 7/1974 | Cook et al. ....................... | 65/DIG. 7 |
| 3,829,195 | 8/1974 | Rawson ........................... | 65/DIG. 7 |
| 3,928,102 | 12/1975 | Rowe et al. ....................... | 65/4 B X |
| 3,933,409 | 1/1976 | Kloots ................................. | 65/4 A |

*Primary Examiner*—S. Leon Bashore
*Assistant Examiner*—Frank W. Miga
*Attorney, Agent, or Firm*—John T. O'Halloran; Peter C. Van Der Sluys; Richard A. Menelly

[57] ABSTRACT

An optical power divider is disclosed for single mode optical fibers. The fibers to be coupled are inserted in converging bores in a lower refractive index glass block which is collapsed about the fibers and drawn down. In the drawn down region the fibers are reduced in cross-section so that an appreciable proportion of the optical energy will be guided by the fibers while propagating in the surrounding lower refractive index glass block.

4 Claims, 2 Drawing Figures

METHOD OF MAKING OPTICAL FIBER OPTICAL POWER DIVIDER

FIELD OF THE INVENTION

This invention relates to optical fiber optical power dividers.

BACKGROUND OF THE INVENTION

One use for optical fiber optical power dividers is in the combination of fiber optic communication systems. Where multi-access is required ring systems are particularly economical in comparison with networks with separate links interconnecting every point with every other point. For physically small installations, where the transit line around the ring may be negligible compared with the information rate the advantage of feeding energy in both directions around the ring is that the system will still function after a single break at any place in the ring. One example of an optical power divider can be seen in U.S. application Ser. No. 546,853 now abandoned, filed Feb. 4, 1975 and assigned to the common assignee of the instant invention.

The construction of the divider relies upon the fact that the dominant mode $HE_{11}$ has no cut-off wavelength, but as the core size or the core/cladding refractive index difference is reduced more and more of the energy associated with this mode of propagation is carried in the cladding of the fiber waveguide. In the limit, when the core disappears, a plane wave whose normal is the axis of the waveguide is propagating in the cladding. This transformation can be achieved providing the transition is smooth.

SUMMARY OF THE INVENTION

According to the present invention there is provided a method of making an optical fiber optical power divider including the steps of inserting a glass optical fiber into each of two or more converging bores formed in one end of a glass block until the ends of the fibers meet the end of a glass fiber inserted in a bore formed in the opposite end of the glass block, each fiber being a loose fit in its respective bore and the material of the block having a refractive index not greater than that of the cladding glass of the fibres, of heating the block to soften it while maintaining compression between its ends so as to cause the bores to collapse around their respective fibers, and of drawing down a region of the block intermediate its ends which region contains the place at which the fibers meet.

There follows a description of the manufacture of an optical fiber optical power divider embodying the invention in a preferred form. The description refers to the accompanying drawings in which -

DESCRIPTION OF THE PREFERRED EMBODIMENT

Figure 1:
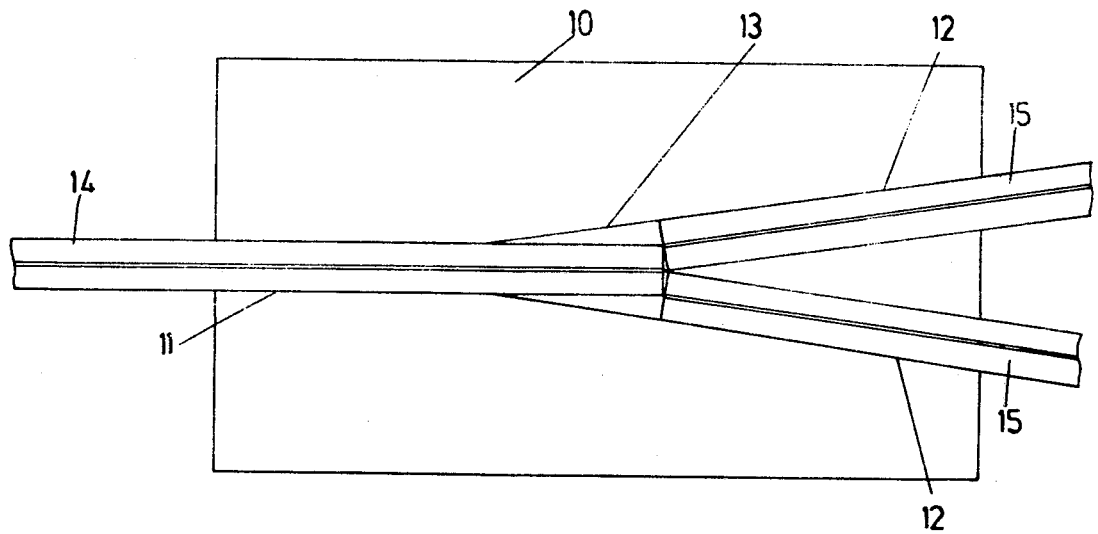
FIG. 1 depicts a glass yoke having bored apertures into which optical fibers are fitted.

Referring to FIG. 1 a cylinderical glass block 10 is provided which has a refractive index equal to or slightly lower than that of the cladding glass of optical fiber waveguide to be used in the construction of the power divider. A hole 11 is bored along the axis of the cylinder approximately to its mid point. Two or more holes 12 are bored from the opposite end of the cylinder so that all the holes meet at a common point 13. Typically these holes 12 are at about 5° to the cylinder axis, and after they have been bored they are flame polished.

The end of an optical fiber 14 is inserted as far as it will go into hole 11, and further optical fibers 15, as far as they will go, into holes 12. Each of these fibers is a loose fit in its respective hole, having a few microns clearance.

The cylinder is mounted with its axis vertical on a support in a furnace. When the cylinder has been softened by the heat it sinks a small amount, either under its own weight or as a result of its upper surface being loaded, and the bores collapse about the fibers to form a solid block.

In order to prevent air bubbles from becoming trapped, the heating is initially fiercest at the mid point along the length of the cylinder so that this is the first part to soften. Then the furnace is programmed so that the hot zone extends slowly towards both ends of the cylinder.

Figure 2:
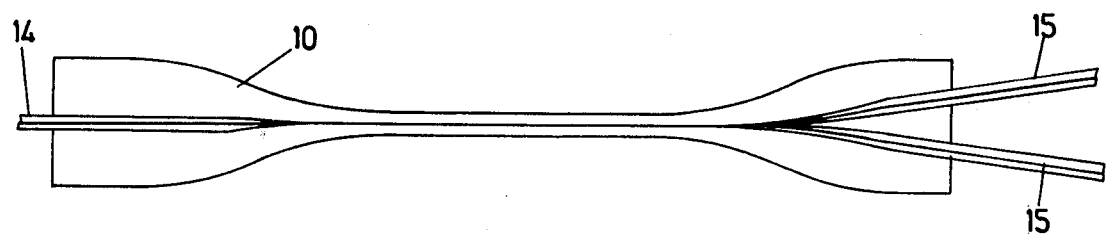
FIG. 2 depicts the yoke after it has been collapsed around the fibers and after its central section has been drawn down to form the power divider.

The central section of the cylinder is then heated again until it is soft enough for drawing. It is then drawn until the fibers inside this central section are so reduced in diameter that optical energy propagating along them extends significantly out into the material of the cylinder which now has a waisted appearance depicted schematically in FIG. 2.

The reduction in cross-sectional area of the cores in the drawn down region of the power divider causes optical energy propagating in the fibers to spread through the cladding until it reaches the interface between the cladding glass and the glass of the cylinder. If these two glasses have matching refractive index the interface has no optical effect. If, however, the cylinder has a lower refractive index the interface provides a measure of useful optical guidance, whereas if the cylinder had a higher refractive index optical energy penetrating this interface would not be properly guided.

It is to be understood that the foregoing description of specific examples of this invention is made by way of example only and is not to be considered as a limitation on its scope.

What is claimed is:

1. A method of making an optical fiber optical power divider comprising the steps of:
   inserting a glass optical fiber having a core and cladding into a bore formed in one end of a glass block having an index of refraction in the range of less than and equal to the optical fiber cladding;
   inserting a glass optical fiber having a core and cladding into each of at least two converging bores formed in an opposite end of the glass block so that the ends of the fibers inserted in said opposite end of said glass block contact an end of the fiber inserted in said one end of said glass block having an index of refraction in the range of less than and equal to the optical fiber cladding;
   heating the block to a softening temperature to collapse the bores of the glass block; and
   drawing said glass block to reduce the cross-section of said block proximate said fiber ends.

2. The method of claim 1 wherein the bores of said glass block are collapsed by first providing a hot zone proximate said fiber ends and then expanding said hot zone to the ends of the blocks.

3. The method of claim 1 wherein the cross-section of said block proximate the fiber ends is less than the cross-section of said optical fibers before drawing.

4. The method of claim 1 wherein the refractive index of said glass block is equal to the index of refraction of the optical fiber cladding.

* * * * *